United States Patent [19]

McKenna

[11] Patent Number: 5,125,516

[45] Date of Patent: Jun. 30, 1992

[54] APPARATUS FOR CONSOLIDATING A VARIABLE PLURALITY OF DEVICES

[76] Inventor: Michael R. McKenna, 1122 W. Morse Ave., Chicago, Ill. 60626

[21] Appl. No.: 617,097

[22] Filed: Nov. 23, 1990

[51] Int. Cl.$^5$ .................................................. A47F 7/00
[52] U.S. Cl. .................................... 211/13; 248/205.2; 211/189
[58] Field of Search ............... 248/205.2, 176, 309.1; 211/13, 189; 160/135; D6/466, 455, 475, 457

[56] References Cited

U.S. PATENT DOCUMENTS

| | | | |
|---|---|---|---|
| 1,399,305 | 12/1921 | Molnar | 248/309.1 X |
| 3,273,891 | 9/1966 | Grim, Jr. | 248/205.2 |
| 3,370,818 | 2/1968 | Perr | 248/205.2 |
| 3,562,973 | 2/1971 | Gangemi | 160/135 |
| 3,913,656 | 10/1975 | Guyer | 160/135 |
| 4,712,693 | 12/1987 | Striplin | 211/13 X |
| 4,838,505 | 6/1989 | Lowe | 248/176 |
| 4,878,585 | 11/1989 | Orestano | 248/309.1 X |
| 4,884,713 | 12/1989 | Handler | 248/205.2 |
| 4,926,609 | 5/1990 | Arico | 160/135 X |
| 4,934,522 | 6/1990 | Nelson | 248/205.2 X |
| 4,934,646 | 6/1990 | Doyle | 248/309.1 |
| 4,979,554 | 12/1990 | Nelson | 160/135 |
| 4,991,892 | 2/1991 | Burrell | 211/13 X |
| 5,007,473 | 4/1991 | Evensen | 160/135 |
| 5,025,931 | 6/1991 | Berger | 248/176 X |

FOREIGN PATENT DOCUMENTS 997938  12/1964  United Kingdom ............ 248/205.2

*Primary Examiner*—Carl D. Friedman
*Assistant Examiner*—Korie H. Chan
*Attorney, Agent, or Firm*—James W. Clement

[57] ABSTRACT

This invention relates to a portable hand-held apparatus which orients, retains and consolidates a variable plurality of electronic remote control devices. In the present invention the remotes are attached peripherally in such a manner that the control buttons of the individual remotes are easily accessible and the opposite ends of the attached remotes form a footing for the consolidating apparatus. Additionally, as the consumer increases the number of audio/visual components within the household, each with its own remote control device, the present invention will variably adapt to accommodate such growth in the number of remote control devices.

30 Claims, 1 Drawing Sheet

U.S. Patent  June 30, 1992  5,125,516
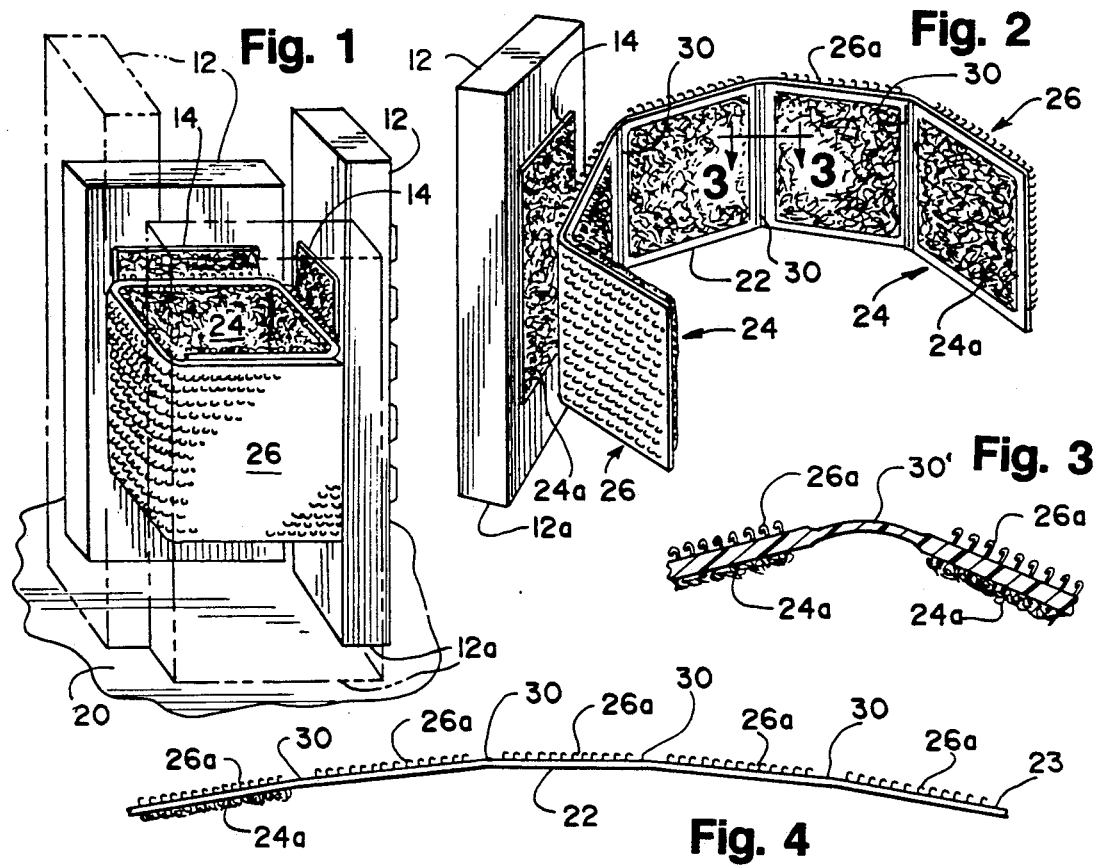
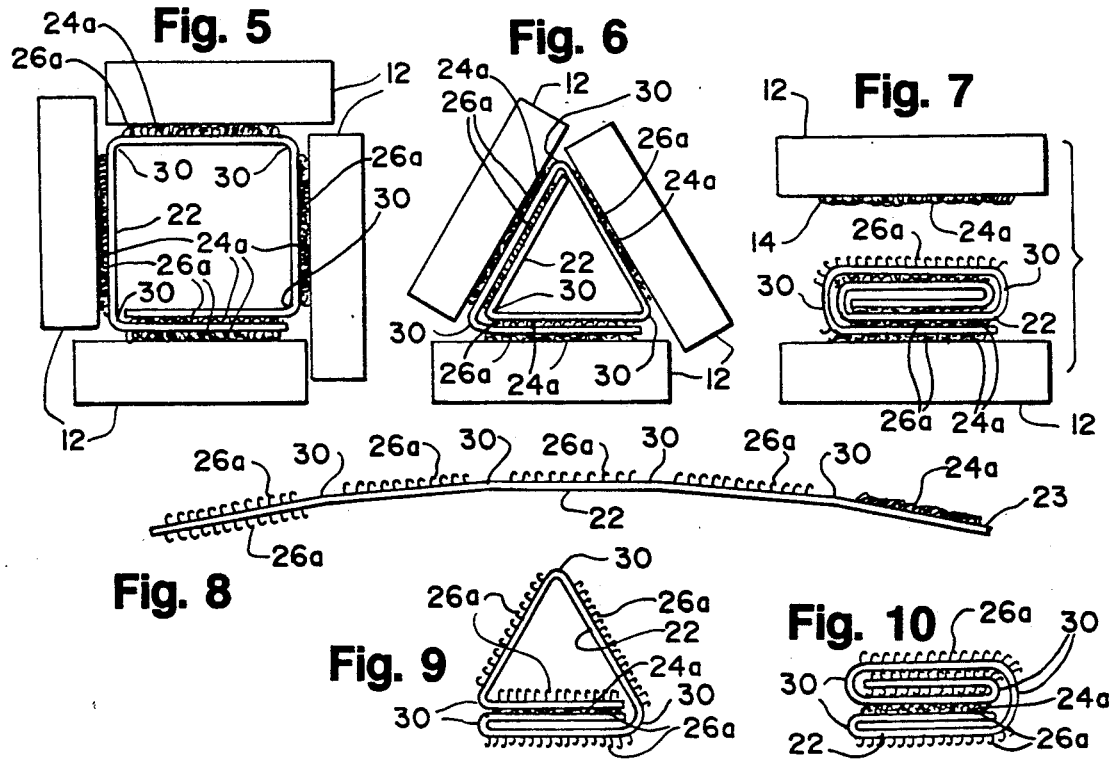

APPARATUS FOR CONSOLIDATING A VARIABLE PLURALITY OF DEVICES

BACKGROUND OF THE INVENTION

This invention relates to a portable hand-held apparatus which orients, retains and consolidates a variable plurality of devices, particularly electronic remote control units.

For most of the last decade, television sets (TVs), video cassette recorders (VCRs), audio tuner/amplifiers, and more recently compact disk (CD) players have been available each with the capability of being operated remotely by its companion electronic remote control unit (remote). To operate one of these electronic components in an area of the home that the user has established as an audio/video center, the user must first locate the proper remote. This task becomes increasingly difficult as the number of remotes increase. Remarkably and inevitably the remote first located is not the one needed to control the desired electronic component, and the search continues. To alleviate this problem, and others which will become apparent from the disclosure which follows, the present invention conveniently consolidates the remotes into a focal location and retains and orients the remotes for easy use.

Alternative electronic technology is available in the form of an expensive remote control device, purchased separately, which mimics the signal output of the several distinct remotes provided with the individual components. The principal disadvantage of such a device is its cost and the waste of valuable displaced equipment.

U.S. Pat. No. 4,712,693, issued to Stiplin in 1987, relates to a stationary remote control unit console consisting of a base and a rotating member with a fixed number of remote control attachment surfaces. A recently issued patent to Lowe, U.S. Pat. No. 4,838,505, teaches a remote control holder defined by a base attached to a rigid walled structure to which a preselected number of remote control devices are attached. An alternative device shown in U.S. Pat. No. 4,502,746, issued to Wells, discloses a rigid structure for orienting and storing remote control units comprised of embodiments with predetermined walled structures which rest on its extended wall spacer means providing a predetermined number of remote control attachment means.

Some of the drawbacks to these designs are that each teaches a less manageable structure comprised of rigid walls and base elements which weigh more and are less easily handled than the instant invention. Moreover, none of the foregoing inventions is designed to be portably hand-held.

U.S. Pat. No. 4,660,792, issued to Rogalski in 1987, teaches a portable holder and protective cover for two side-by-side remote control units. Its principal drawback is that it combines only two remote control units. Lastly, the remote control holder taught by U.S. Pat. No. 4,848,609, issued to Meghnot in 1989, combines two remote control units in a framed side-by side relationship consisting of interconnecting pieces. Meghnot's design requires assembly and adjustments to interlock and fit the framing sections to the dimensions of the individual remote control unit.

Another disadvantage to all of the foregoing devices is that they provide for a predetermined number of remote control attachment means.

ADVANTAGES OF THIS INVENTION

Unlike the foregoing devices which teach structures that support a predetermined number of remote control units, the apparatus of the present invention can variably adapt to consolidate 2, 3, 4 or more remote control units in a single embodiment. It can be unfolded to expose more outward attachment surfaces or, conversely, it can be folded to expose a minimum of two attachment surfaces. Accordingly, as the user of this apparatus increases the number of audio/visual components within the household, each with its own remote control device, the present invention will variably adapt to accommodate such growth in the number of remote control devices.

The instant remote control consolidating apparatus provides an efficient and convenient means of bringing the remotes together in a unit which can be easily located and the proper remote easily identified and used. In the present invention the remotes are attached peripherally in such a way that the control buttons of the individual remotes are easily accessible, with the remote control transfer beams oriented in the same direction axially. Other advantages of the present invention include reduced cost of manufacture and the foldable elimination of unused attachment surfaces which, necessarily left exposed in the prior art designs, gather dirt and lint which are difficult to remove from the attachment surfaces. This apparatus can be integrally formed from a washable material, such as polypropylene.

Moreover, the apparatus of the present invention is portably hand-held, easily managed and lightweight, and can easily be transferred from one user to another. This invention provides for the first time a portable hand-held apparatus for retaining, orienting and consolidating a variable number of remote control units.

In brief, this separable consolidating invention provides a portable, hand-held, inexpensive, washable, lightweight, variably expandable apparatus, and these features are particularly significant when it is constructed to support a variable plurality of electronic remote control units of all types. It will be further appreciated in the broadest application, the invention is nevertheless extremely useful supporting, securing and connecting any object or device to another object or device.

Still other advantages will be apparent from the disclosure that follows.

SUMMARY OF THE INVENTION

The invention relates to a portable hand-held apparatus which orients, retains and consolidates a variable plurality of devices, particularly electronic remote control units, into a focal location for easy use. The present invention discloses a separable consolidating apparatus adapted to support a plurality of second members on a first member.

The consolidating apparatus comprises an elongated strap member transversely foldable to form a plurality of strap portions, having first engaging means disposed on a first surface thereof and complementary engaging means disposed on the opposite surface of the strap member, and a plurality of separate, individual sheet members having the complementary engaging means disposed on a first surface thereof and an attaching means, such as an adhesive layer or a magnetic strip, on its opposite surface. Each of the complementary engaging means disposed on the first surface of each of the sheet members is arranged and adapted to be placed in matingly engaged face-to-face relation with the first engaging means on one of the portions of the strap member, to secure the sheet members to the strap member. In this manner a device, such as an electronic remote control device, to which the sheet member is affixed by the attaching means may be supported by the strap member.

The strap member may be joined to itself to outwardly expose the first engaging means on the first surface thereof, to provide for the peripheral attachment of devices, by placing the complementary engaging means of at least one portion of the strap member in a matingly engaged face-to-face relation with the outwardly arranged first engaging means of at least one portion of the strap member. This folds the consolidating apparatus transversely upon itself to secure the ends of the strap member. Alternatively, the joining of the ends of the strap member may be accomplished by any known fastening means attached to a surface or end of the strap member without departing from the scope of the invention disclosed herein.

With the backside of each remote control unit adhesively secured to a sheet member, the complementary engaging elements disposed on the first surface thereof are then separably attached to the first engaging elements disposed outwardly from the surface of the folded strap member, with the remote control transfer beam for each remote oriented in the same direction axially, to constitute the remote control consolidating apparatus with a plurality of remotes attached thereto. The end of each attached remote, opposite its transfer beam, can be positioned to lie in a plane forming a footing for this consolidating apparatus.

BRIEF DESCRIPTION OF THE DRAWINGS

Preferred embodiments of the invention are described hereinafter with reference to the accompanying drawing wherein:

FIG. 1 is a perspective view of a first preferred embodiment of the consolidating apparatus of the present invention showing first engaging means extending along the entire length of a first surface of the strap member and complementary engaging means extending along the entire length of the opposite surface of said strap member arranged to consolidate four remote control devices, two of which are partially hidden by the consolidating apparatus and two of which are shown in phantom.

FIG. 2 is a perspective view of a second preferred embodiment of the consolidating apparatus of the present invention showing the first engaging means on the first surface and the complementary engaging means on the opposite surface, both extending along the entire length of the strap member disposed in sections separated by intervening transverse surface voids, said strap member being partially folded and in a position to be attached to a sheet member secured to a remote control device.

FIG. 3 is a side elevation view of the strap member of FIG. 2 taken along the line 3—3 showing a further preferred embodiment of the consolidating apparatus of the present invention being a live hinge pivot means extending transversely between adjacent portions of the strap member.

FIG. 4 is a side elevation view of the unfolded strap member of a third preferred embodiment of the consolidating apparatus of this invention showing the first engaging elements extending along the entire length of the first surface of the strap member disposed in sections separated by intervening transverse surface voids and the complementary engaging elements disposed in only a single section covering a terminal portion of the opposite surface of said strap member.

FIG. 5 is a side elevation view of the consolidating apparatus of the present invention showing the strap member of FIG. 4 or FIG. 8 arranged to consolidate four remote control devices.

FIG. 6 is a side elevation view of the consolidating apparatus of the present invention showing the strap member of FIG. 4 arranged to consolidate three remote control devices.

FIG. 7 is an exploded side elevation view of the consolidating apparatus of the present invention showing the strap member of FIG. 4 arranged to consolidate two remote control devices with one remote control unit detached to show the detail of the first engaging means disposed outwardly on one of the portions of the first surface of the strap member and its arrangement to be placed in a matingly engaged face-to-face relation with the complementary engaging means disposed on the first surface of a sheet member that is adhesively secured to a remote control device.

FIG. 8 is a side elevation view of the unfolded strap member of a fourth preferred embodiment of the consolidating apparatus of the present invention showing first engaging elements extending along the entire length, except for a terminal portion, on the first surface of said strap member and complementary engaging means disposed on said terminal portion of the first surface thereof disposed in sections separated by intervening transverse surface voids, and showing additional first engaging elements on the opposite surface disposed on the strap portion opposite the end on which the complementary engaging means are disposed.

FIG. 9 is a side elevation view of the embodiment of FIG. 8 of the strap member arranged with three engagement surface portions exposed to consolidate three remote control devices.

FIG. 10 is a side elevation view of the embodiment of FIG. 8 of the strap member arranged with two engagement surface portions exposed to consolidate two remote control devices.

DETAILED DESCRIPTION OF THE INVENTION

The preferred embodiments depicted in the drawing comprise an elongated strap member 22 of sufficient length to consolidate up to four remote control devices 12. Without departing from the generality of the invention disclosed herein, the strap member 22 could be further lengthened to accommodate a greater maximum number of the devices or made shorter to accommodate a lesser maximum number. The discussion that follows, without limiting the scope of the invention, will refer to the invention as depicted in the drawing, showing an apparatus that will accommodate two, three or four remote control devices 12 determined only by the manner in which the strap member 22 is arranged.

As best shown in FIG. 2 of the drawing, the present invention provides a separable consolidating apparatus adapted to support a plurality of separate, individual, selectively attachable securing sheet members 14 on a strap member 22. The strap member 22 is an elongated strap transversely foldable to form a plurality of strap portions, having first engaging means 26 disposed on a first surface 23 thereof and complementary engaging means 24 provided on the opposite surface of the strap member 22.

Transverse folding of the strap member 22 allows it to be joined to itself by arranging the complementary engaging means 24 of at least one portion of the strap member in a matingly engaged face-to-face relation with at least one portion of the outwardly disposed first engaging means 26 of the strap member, or by any generally known fastening means.

A plurality of separate, individual sheet members 14 is further provided. Each of said sheet members 14 having said complementary engaging means 24 disposed on a first surface thereof and an attaching means, such as an adhesive, on its opposite surface. The back surface, being the surface opposite the control buttons, of each remote control device 12 is adhesively affixed to one of the sheet members 14.

The complementary engaging means 24 disposed on the first surface of each of the sheet members 14 are arranged and adapted to be placed in matingly engaged face-to-face relation with the first engaging means 26 on one of the portions of the strap member 22. The remote control transfer beams are preferably oriented in the same direction axially for ease of use. The ends 12a, opposite the transfer beam, of each attached remote 12 can be positioned to lie in a plane 20 forming a footing for the consolidating apparatus with remotes attached, as shown in FIG. 1.

The strap member 22 may be integrally constructed of a rigid polymer, such as polypropylene, or a woven or knitted synthetic heat deformable material such as nylon, polyester or the like.

When the strap member 22 is made of a flexible material such as nylon, polyester or the like, it is preferred that its width be increased in order to provide resistance to unreasonable distortion. The width of the strap member 22 is limited only by the height of the shortest remote control device to be consolidated and the dimensions of the battery replacement cover. For a strap member 22 constructed of a flexible material, a strap member width of approximately three inches or less is generally sufficient. Correspondingly, each sheet member 14 should be adaptably sized to adhere to the backside of an electronic remote control device 12 and one strap portion or section of the first engaging elements 26a arranged to be placed in matingly engaged face-to-face relation with the complementary engaging elements 24a disposed on the first surface of the sheet member 14.

In its preferred form, the attaching means of each sheet member 14 is comprised of a pressure-sensitive adhesive coating. By means of this adhesive coating, a remote control device 12 can be positioned and adhered to a sheet member 14.

In the present invention, the first engaging elements 26a and complementary engaging elements 24a, may be constructed in the form of any flexible engaging elements which are readily securable in face-to-face relation, and which particularly resist forces parallel to the interfacial plane of engagement, including hook-type hooking elements, loop-type hooking elements, mushroom-like elements, resilient projections, are contemplated within the scope of the present invention.

In the first preferred embodiment of the consolidating apparatus of the present invention the first engaging means 26 extend along the entire length of first surface of the strap member 22 and the complementary engaging means 24 extend along the entire length of the opposite surface of said strap member 22. The strap member 22 may be folded along a plurality of hinge joints 30, each lying transverse to the longitudinal axis of the elongated strap member 22 to form a plurality of strap portions. The first engaging means 26 exposed on each outwardly disposed strap portion of the folded strap member 22 define an engagement surface that can be matingly engaged to the complementary engaging means 24 of a sheet member 14 with a remote control device 12 attached thereto.

The first engaging means 26 may comprise a plurality of first engaging elements 26a and the complementary engaging means 24 may comprise a plurality of complementary engaging elements 24a.

In the consolidating apparatus of the first preferred embodiment in which the strap member 22 is of sufficient length to consolidate a maximum of four remote control devices 12, the strap member 22 is folded along four generally equidistant transverse axes to form five strap portions, and only the first engaging elements 26a that are disposed on the strap portion at one end of the strap member 22 are matingly engaged with the portion of complementary engaging elements 24a on the opposite surface and the opposite end of the strap member 22, whereby the strap member 22 is arranged and adapted to expose first engaging elements 26a on four strap portions, each of which may be placed in matingly engaged face-to-face relation with the complementary engaging elements 24a disposed on the first surface of a sheet member 14, to consolidate four remote control devices 12.

The strap member 22 of the first embodiment of the consolidating apparatus of the present invention may be folded along four generally equidistant transverse axes to form five strap portions, and only the first engaging elements 26a that are disposed on the two adjacent portions at one end of the strap member 22 are matingly engaged with the two adjacent portions of complementary engaging elements 24a on the opposite surface and the opposite end of the strap member 22, whereby the strap member 22 is arranged and adapted to expose three first engaging element portions each of which may be placed in matingly engaged face-to-face relation with the complementary engaging elements 24a disposed on the first surface of a sheet member 14, to consolidate three remote control devices 12.

The strap member 22 of the first embodiment of the consolidating apparatus of the present invention may be folded along four generally equidistant transverse axes to form five strap portions, and only the first engaging elements 26a disposed on the three adjacent portions at one end of the strap member 22 are matingly engaged with the three adjacent portions of complementary engaging elements 24a on the opposite surface and the opposite end of the strap member 22, whereby said strap member is arranged and adapted to expose two first engaging element portions each of which may be placed in matingly engaged face-to-face relation with the complementary engaging elements 24a disposed on the first surface of a sheet member 14, to consolidate two remote control devices 12.

Without departing from the generality of the invention disclosed herein, the first engaging elements 26a and the complementary engaging elements 24a could be presented on the strap member 22 as continuous and without surface separation. Without limiting the scope of the invention, I will refer to the invention as depicted in the drawing, showing the following preferred embodiments, depicted in FIGS. 2-10 of the drawing, having the first engaging means 26 and the complementary engaging means 24 of the strap member 22 presented in sections separated by intervening transverse surface voids 30 to facilitate folding. The surface voids 30 on the strap member 22 allow for tighter folding, particularly when a minimal number of electronic remote control devices 12 are consolidated.

In the consolidating apparatus of the second preferred embodiment in which the strap member 22 is of sufficient length to consolidate a maximum of four remote control devices 12, the strap member 22 is folded along four generally equidistant transverse axes or hinge joints 30 to form five strap portions, in which the first engaging means 26 and the complementary engaging means 24 are disposed in sections within the surface area defined by said strap portions, and adjacent sections are separated by intervening transverse surface voids 30 which provide a transverse hinge joint between the adjacent sections on the strap member 22 to facilitate transverse folding between adjacent strap portions. See FIG. 2.

In the consolidating apparatus of the second preferred embodiment, the strap member 22 is folded along the generally equidistant transverse axes or hinge joints 30 to form five strap portions, and only the section of first engaging elements 26a that is disposed at one end of the strap member 22 may be matingly engaged with the section of complementary engaging elements 24a disposed on the opposite surface and the opposite end of the strap member 22, whereby the strap member 22 is arranged and adapted to expose four first engaging element sections each of which may be placed in matingly engaged face-to-face relation with the complementary engaging elements 24a disposed on the first surface of a sheet member, to consolidate four remote control devices.

In the consolidating apparatus of the second preferred embodiment, the strap member 22 is folded along the generally equidistant transverse axes or hinge joints 30 to form five strap portions, and only the two adjacent sections of first engaging elements 26a that are disposed at one end of the strap member 22 may be matingly engaged with the two adjacent sections of complementary engaging elements 24a disposed on the opposite surface and the opposite end of the strap member 22, whereby said strap member 22 is arranged and adapted to expose three first engaging element sections each of which may be placed in matingly engaged face-to-face relation with the complementary engaging elements 24a disposed on the first surface of a sheet member 14, to consolidate three remote control devices 12.

In the consolidating apparatus of the second preferred embodiment, the strap member 22 is folded along the generally equidistant transverse axes or hinge joints 30 to form five strap portions, and only the three adjacent sections of first engaging elements 26a that are disposed at one end of the strap member 22 may be matingly engaged with the three adjacent sections of complementary engaging elements 24a disposed on the opposite surface and the opposite end of the strap member 22, whereby said strap member 22 is arranged and adapted to expose two first engaging element sections each of which may be placed in matingly engaged face-to-face relation with the complementary engaging elements 24a disposed on the first surface of a sheet member 14, to consolidate two remote control devices 12.

Referring to FIGS. 4, 5, 6 and 7, there is shown a third preferred embodiment of the strap member 22 where the sections of first engaging elements 26a extend along the entire length of first surface 23 and the complementary engaging elements 24a cover only a terminal section of the opposite surface of the strap member 22.

In the consolidating apparatus of the third preferred embodiment in which the strap member 22 is of sufficient length to consolidate a maximum of four remote control devices 12, the strap member 22 is folded along four generally equidistant transverse axes or hinge joints 30 to form five strap portions, and only the section of first engaging elements 26a that is disposed at the end of the strap member 22 opposite the end bearing the section of complementary engaging elements 24a may be matingly engaged with the section of complementary engaging elements 24a disposed on the opposite surface thereof, whereby said strap member 22 may be arranged and adapted to expose four first engaging element sections each of which may be placed in matingly engaged face-to-face relation with the complementary engaging elements 24a disposed on the first surface of a sheet member 14, to consolidate four remote control devices 12.

In the consolidating apparatus of the third preferred embodiment, strap member 22 is folded along four generally equidistant transverse axes or hinge joints 30 to form five strap portions, and only the section of first engaging elements 26a that is disposed second from the end of the strap member 22 opposite the end bearing the section of complementary engaging elements 24a may be matingly engaged with the section of complementary engaging elements 24a disposed on the opposite surface thereof, whereby said strap member 22 is arranged and adapted to expose three first engaging element sections each of which may be placed in matingly engaged face-to-face relation with the complementary engaging elements 24a disposed on the first surface of a sheet member 14, to consolidate three remote control devices 12.

In the consolidating apparatus of the third preferred embodiment, the strap member 22 is folded along four generally equidistant transverse axes or hinge joints 30 to form five strap portions, and only the section of first engaging elements 26a that is disposed third from the end of the strap member 22 opposite the end bearing the section of complementary engaging elements 26a may be matingly engaged with said section of complementary engaging elements 24a disposed on the opposite surface thereof, whereby said strap member 22 is arranged and adapted to expose two first engaging element sections each of which may be placed in matingly engaged face-to-face relation with the complementary engaging elements 24a disposed on the first surface of a sheet member 14, to consolidate two remote control devices 12.

The fourth preferred embodiment of the consolidating apparatus of the present invention is depicted in FIGS. 5, 8, 9, and 10, showing a strap member 22 of sufficient length to consolidate a maximum of four remote control devices 12 having first engaging elements 26a extending along the entire length, except for a terminal portion, on a first surface of the strap member 22 and complementary engaging elements 24a disposed on the remaining terminal portion of the first surface thereof, and having additional first engaging elements 26a on the opposite surface of the strap member 22 that are disposed on the strap portion opposite the end on which the complementary engaging elements 24a are disposed.

In the consolidating apparatus of the fourth preferred embodiment, in which the strap member 22 is folded along four generally equidistant transverse axes or hinge joints 30 to form five strap portions, and the section of first engaging elements 26a disposed on the opposite surface of the strap member 22 at the end opposite the section of complementary engaging elements 24a may be matingly engaged with the section of complementary engaging elements 24a disposed on the first surface of the strap member, whereby said strap member 22 is arranged and adapted to expose four first engaging element sections each of which may be placed in matingly engaged face-to-face relation with the complementary engaging elements 24a disposed on the first surface of a sheet member 14, to consolidate four remote control devices 12.

In the consolidating apparatus of the fourth preferred embodiment, in which the strap member 22 is folded along four generally equidistant transverse axes or hinge joints 30 to form five strap portions, and only the section of first engaging elements 26a disposed on the first surface of the strap member 22 at the end opposite the section of complementary engaging elements 24a is matingly engaged with said section of complementary engaging elements 24a disposed on the first surface of the strap member, whereby the strap member 22 is arranged and adapted to expose three first engaging element sections each of which may be placed in matingly engaged face-to-face relation with the complementary engaging elements 24a disposed on the first surface of a sheet member 14, to consolidate three remote control devices 12.

In the consolidating apparatus of the fourth preferred embodiment, in which the strap member 22 is folded along four generally equidistant transverse axes or hinge joints 30 to form five strap portions, and only the section of first engaging elements 26a disposed on the first surface of the strap member 22, being the second section from the end opposite the end bearing the section of complementary engaging elements 24a, is matingly engaged with the section of complementary engaging elements 24a disposed on the first surface of the strap member, whereby the strap member 22 is arranged and adapted to expose two first engaging element sections each of which may be placed in matingly engaged face-to-face relation with the complementary engaging elements 24a disposed on the first surface of a sheet member 14, to consolidate two remote control devices 12.

Live hinge pivot means 30' extending transversely along the surface void 30 between adjacent sections of first engaging elements of the strap member 22 are preferred for polypropylene and like polymeric materials. The live hinge pivot means 30' may be easily and economically formed during the molding process resulting in a reduction in the strap member 22 wall thickness 30'. See FIG. 3.

It will be appreciated that the use of live hinge pivot means 30' extending transversely along the surface voids 30 of the strap member 22 allows for a greater range of acceptable materials for the transversely foldable strap member 22.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

What is claimed is:

1. An apparatus for consolidating a variable plurality of devices, such as electronic remote control devices, said apparatus comprising:
    a. an elongated strap member transversely foldable to form strap portions of generally uniform size, said strap member having first engaging means disposed on a first surface of said strap and complementary engaging means disposed on the opposite surface thereof and being selectively foldable to expose the first surface of a plurality of strap portions variable in number; and
    b. a plurality of separate, individual sheet members each of which has said complementary engaging means disposed on a first surface thereof and an attaching means disposed on the opposite surface thereof;
    said complementary engaging means disposed on the first surface of each of said sheet members being arranged and adapted to be placed in matingly engaged face-to-face relation with the first engaging means on one of said portions of the strap member, to secure the sheet members to the strap member,
    whereby a device to which said sheet member is affixed by said attaching means may be supported by said strap member.

2. The consolidating apparatus of claim 1 in which the strap member is adapted to be transversely folded to join itself by a fastening means with the first engaging means on the first surface thereof outwardly disposed.

3. The consolidating apparatus of claim 2 in which the fastening means comprises the complementary engaging means of at least one portion of the strap member arranged in a matingly engaged face-to-face relation with the outwardly disposed first engaging means of at least one portion of the strap member.

4. The consolidating apparatus of claim 3 in which the first engaging means extends along the entire length of first surface of the strap member and the complementary engaging means extends along the entire length of the opposite surface of said strap member.

5. The consolidating apparatus of claim 4 in which the strap member is of sufficient length to consolidate a maximum of four remote control devices.

6. The consolidating apparatus of claim 5 in which the strap member is folded along four transverse axes to form five strap portions, and only the first engaging elements that are disposed on the strap portion at one end of the strap member are matingly engaged with the portion of complementary engaging elements on the opposite surface and the opposite end of the strap member, whereby said strap member is arranged and adapted to expose four first engaging element portions each of which may be placed in matingly engaged face-to-face relation with the complementary engaging elements disposed on the first surface of a sheet member, to consolidate four remote control devices.

7. The consolidating apparatus of claim 5 in which the strap member is folded along four transverse axes to form five strap portions, and only the first engaging elements that are disposed on the two adjacent strap portions at one end of the strap member are matingly engaged with the two adjacent portions of complementary engaging elements on the opposite surface and the opposite end of the strap member, whereby said strap member is arranged and adapted to expose three first engaging element portions each of which may be placed in matingly engaged face-to-face relation with the complementary engaging elements disposed on the first surface of a sheet member, to consolidate three remote control devices.

8. The consolidating apparatus of claim 5 in which the strap member is folded along four transverse axes to form five strap portions, and only the first engaging elements that are disposed on the three adjacent strap portions at one end of the strap member are matingly engaged with the three adjacent portions of complementary engaging elements on the opposite surface and the opposite end of the strap member, whereby said strap member is arranged and adapted to expose two first engaging element portions each of which may be placed in matingly engaged face-to-face relation with the complementary engaging elements disposed on the first surface of a sheet member, to consolidate two remote control devices.

9. The consolidating apparatus of claim 4 in which the first engaging means and the complementary engaging means are disposed in sections within the surface area defined by said strap portions, and adjacent sections are separated by intervening transverse surface voids,
   whereby each of said intervening transverse surface voids provides a transverse hinge joint between said adjacent sections on the strap member to facilitate transverse folding between adjacent strap portions.

10. The consolidating apparatus of claim 9 in which the strap member is of sufficient length to consolidate a maximum of four remote control devices.

11. The consolidating apparatus of claim 10 in which the strap member is folded along the transverse hinge joints to form five strap portions, and only the section of first engaging elements that is disposed at one end of the strap member is matingly engaged with the section of complementary engaging elements disposed on the opposite surface and the opposite end of the strap member, whereby said strap member is arranged and adapted to expose four first engaging element sections each of which may be placed in matingly engaged face-to-face relation with the complementary engaging elements disposed on the first surface of a sheet member, to consolidate four remote control devices.

12. The consolidating apparatus of claim 10 in which the strap member is folded along the transverse hinge joints to form five strap portions, and only the two adjacent sections of first engaging elements that are disposed at one end of the strap member are matingly engaged with the two adjacent sections of complementary engaging elements disposed on the opposite surface and the opposite end of the strap member, whereby said strap member is arranged and adapted to expose three first engaging element sections each of which may be placed in matingly engaged face-to-face relation with the complementary engaging elements disposed on the first surface of a sheet member, to consolidate three remote control devices.

13. The consolidating apparatus of claim 10 in which the strap member is folded along the transverse hinge joints to form five strap portions, and only the three adjacent sections of first engaging elements that are disposed at one end of the strap member are matingly engaged with the three adjacent sections of complementary engaging elements disposed on the opposite surface and the opposite end of the strap member, whereby said strap member is arranged and adapted to expose two first engaging element sections each of which may be placed in matingly engaged face-to-face relation with the complementary engaging elements disposed on the first surface of a sheet member, to consolidate two remote control devices.

14. The consolidating apparatus of claim 3 in which the first engaging elements extend along the entire length of first surface of the strap member and the complementary engaging elements cover only a terminal portion of the opposite surface of said strap member.

15. The consolidating apparatus of claim 14 in which the first engaging means and the complementary engaging means are disposed in sections on the surface area defined by said strap portions, and adjacent sections are separated by intervening transverse surface voids,
   whereby each of said intervening transverse surface voids provides a transverse hinge joint between said adjacent sections on the strap member to facilitate transverse folding between adjacent strap portions.

16. The consolidating apparatus of claim 15 in which the strap member is of sufficient length to consolidate a maximum of four remote control devices.

17. The consolidating apparatus of claim 16 in which the strap member is folded along the transverse hinge joints to form five strap portions, and only the section of first engaging elements that is disposed at the end of the strap member opposite the end bearing the section of complementary engaging elements is matingly engaged with said section of complementary engaging elements disposed on the opposite surface thereof, whereby said strap member is arranged and adapted to expose four first engaging element sections each of which may be placed in matingly engaged face-to-face relation with the complementary engaging elements disposed on the first surface of a sheet member, to consolidate four remote control devices.

18. The consolidating apparatus of claim 16 in which the strap member is folded along the transverse hinge joints to form five strap portions, and only the section of first engaging elements that is disposed second from the end of the strap member opposite the end bearing the section of complementary engaging elements is matingly engaged with said section of complementary engaging elements disposed on the opposite surface thereof, whereby said strap member is arranged and adapted to expose three first engaging element sections each of which may be placed in matingly engaged face-to-face relation with the complementary engaging elements disposed on the first surface of a sheet member, to consolidate three remote control devices.

19. The consolidating apparatus of claim 16 in which the strap member is folded along the transverse hinge joints to form five strap portions, and only the section of first engaging elements that is disposed third from the end of the strap member opposite the end bearing the section of complementary engaging elements is matingly engaged with said section of complementary engaging elements disposed on the opposite surface thereof, whereby said strap member is arranged and adapted to expose two first engaging element sections each of which may be placed in matingly engaged faceto-face relation with the complementary engaging elements disposed on the first surface of a sheet member, to consolidate two remote control devices.

20. An apparatus for consolidating a variable plurality of devices, such as electronic remote control devices, said apparatus comprising:
   a. an elongated strap member transversely foldable to form strap portions of generally uniform size, said strap member having first engaging means extending along the entire length, except for a terminal portion, on a first surface of said strap and complementary engaging means disposed on said remaining terminal portion of the first surface thereof, and having additional first engaging means on the opposite surface disposed on the strap portion opposite the end on which the complementary engaging means are disposed and being selectively foldable to expose the first surface of a plurality of strap portions variable in number; and
   b. a plurality of separate, individual sheet members each of which has said complementary engaging means disposed on a first surface thereof and an attaching means disposed on the opposite surface thereof;
   said complementary engaging means disposed on the first surface of each of said sheet members being arranged and adapted to be placed in matingly engaged face-to-face relation with the first engaging means on one of said portions of the first surface of the strap member, to secure the sheet members to the strap member,
   whereby a device to which said sheet member is affixed by said attaching means may be supported by said strap member.

21. The consolidating apparatus of claim 20 in which the strap member is adapted to be transversely folded to join itself by a fastening means with the first engaging means on the first surface thereof outwardly disposed.

22. The consolidating apparatus of claim 21 in which the fastening means comprises the complementary engaging means of the strap member being inwardly arranged in a matingly engaged face-to-face relation with only one portion of first engaging means of the strap member.

23. The consolidating apparatus of claim 22 in which the first engaging means and the complementary engaging means are disposed in sections on the surface area defined by said strap portions, and adjacent sections are separated by intervening transverse surface voids,
   whereby each of said intervening transverse surface voids provides a transverse hinge joint between said adjacent sections on the strap member to facilitate transverse folding between adjacent strap portions.

24. The consolidating apparatus of claim 23 in which the strap member is of sufficient length to consolidate a maximum of four remote control devices.

25. The consolidating apparatus of claim 24 in which the strap member is folded along the transverse hinge joints to form five strap portions, and only the section of first engaging means that is disposed on the opposite surface of the strap member at the end opposite the section of complementary engaging elements is matingly engaged with said section of complementary engaging elements, whereby said strap member is arranged and adapted to expose four first engaging element sections each of which may be placed in matingly engaged face-to-face relation with the complementary engaging elements disposed on the first surface of a sheet member, to consolidate four remote control devices.

26. The consolidating apparatus of claim 24 in which the strap member is folded along the transverse hinge joints to form five strap portions, and only the section of first engaging elements that is disposed on the first surface of the strap member at the end opposite the section of complementary engaging elements is matingly engaged with said section of complementary engaging elements, whereby said strap member is arranged and adapted to expose three first engaging element sections each of which may be placed in matingly engaged face-to-face relation with the complementary engaging elements disposed on the first surface of a sheet member, to consolidate three remote control devices.

27. The consolidating apparatus of claim 24 in which the strap member is folded along the transverse hinge joints to form five strap portions, and only the section of first engaging elements that is disposed on the first surface of the strap member being the second section from the end opposite the end bearing the section of complementary engaging elements is matingly engaged with said section of complementary engaging elements, whereby said strap member is arranged and adapted to expose two first engaging element sections each of which may be placed in matingly engaged face-to-face relation with the complementary engaging elements disposed on the first surface of a sheet member, to consolidate two remote control devices.

28. A consolidating apparatus as in any one of the preceding claims wherein
   (a) the remote control transfer beams are oriented in the same direction axially and the end of each attached remote opposite its transfer beam is positioned to lie in a plane forming a footing for the consolidating apparatus with remotes attached;
   (b) the attaching means on the opposite surface of the plurality of sheet members is comprised of a pressure-sensitive adhesive coating; and
   (c) the first engaging means and complementary engaging means, may be constructed in the form of any flexible engaging elements which are readily securable in face-to-face relation, and which particularly resist forces parallel to the interfacial plane of engagement, such as, but not limited to, hook-type hooking elements, loop-type hooking elements, mushroom-like elements and resilient projections.

29. A consolidating apparatus as in one of claims 9–27 in which the strap member is integrally constructed of a resilient polymer; and in which a live hinge pivot means extending transversely, along each of the surface voids of the strap member, is provided, whereby the strap member is made transversely foldable.

30. A consolidating apparatus as in claim 29 in which
   (a) the remote control transfer beams are oriented in the same direction axially and the ends, opposite the transfer beam, of the attached remotes may be positioned to lie in a plane forming a footing for the consolidating apparatus with remotes attached;
   (b) the attaching means on the opposite surface of the plurality of sheet members is comprised of a pressure-sensitive adhesive coating;
   (c) the first engaging means and complementary engaging means, may be constructed in the form of any flexible engaging elements which are readily securable in face-to-face relation, and which particularly resist forces parallel to the interfacial plane of engagement, such as, but not limited to, hook-type hooking elements, loop-type hooking elements, mushroom-like elements and resilient projections;

(d) the strap member is integrally constructed of a resilient polymer; and
(e) a live hinge pivot means extends transversely along the surface voids of the strap member;
whereby the strap member is made transversely foldable.

* * * * *